(12) United States Patent
Chen et al.

(10) Patent No.: US 7,692,908 B2
(45) Date of Patent: Apr. 6, 2010

(54) PROTECTION OF POLARITY-SENSITIVE COMPONENTS CONNECTED IN PARALLEL WITH A DIRECT CURRENT MOTOR OR INDUCTOR

(75) Inventors: Harry Chen, Clarendon Hills, IL (US); Eric Junkel, Mount Prospect, IL (US)

(73) Assignee: GLJ, LLC, Chicago, IL (US)

( * ) Notice: Subject to any disclaimer, the term of this patent is extended or adjusted under 35 U.S.C. 154(b) by 273 days.

(21) Appl. No.: 11/968,439

(22) Filed: Jan. 2, 2008

(65) Prior Publication Data

US 2009/0168276 A1 Jul. 2, 2009

(51) Int. Cl.
 *H02H 3/00* (2006.01)
(52) U.S. Cl. .............................. 361/82; 361/84; 361/88; 307/127; 327/546; 327/537
(58) Field of Classification Search ................. 318/490; 361/82, 84, 88; 307/127; 327/546, 537
 See application file for complete search history.

(56) References Cited

U.S. PATENT DOCUMENTS

| | | | |
|---|---|---|---|
| 3,273,039 A | 9/1966 | Godshalk et al. | |
| 3,300,702 A | 1/1967 | Noddin | |
| 3,377,540 A | 4/1968 | Meyer | |
| 4,186,337 A | 1/1980 | Volk et al. | |
| 4,209,816 A | 6/1980 | Hansen | |
| 4,567,773 A | 2/1986 | Cooper et al. | |
| 4,857,985 A * | 8/1989 | Miller | 307/127 |
| 5,144,517 A | 9/1992 | Wieth | |
| 5,517,379 A * | 5/1996 | Williams et al. | 361/84 |
| 5,519,557 A | 5/1996 | Kopera, Jr. et al. | |
| 5,519,559 A | 5/1996 | Dides et al. | |
| 5,625,518 A * | 4/1997 | Bober | 361/56 |
| 5,642,251 A * | 6/1997 | Lebbolo et al. | 361/84 |
| 5,757,600 A * | 5/1998 | Kiraly | 361/84 |
| 6,326,767 B1 | 12/2001 | Small et al. | |
| 6,577,482 B1 * | 6/2003 | Eisenhardt et al. | 361/84 |
| 6,611,410 B1 * | 8/2003 | Makaran | 361/84 |
| 6,650,520 B2 * | 11/2003 | He | 361/84 |
| 6,719,283 B2 | 4/2004 | Tsuchiya et al. | |
| 7,312,653 B2 * | 12/2007 | Chen et al. | 327/545 |
| 7,589,490 B2 * | 9/2009 | Haesters et al. | 318/811 |
| 2003/0063900 A1 * | 4/2003 | Wang et al. | 388/806 |

\* cited by examiner

*Primary Examiner*—Rita Leykin
(74) *Attorney, Agent, or Firm*—Cook Alex Ltd.

(57) ABSTRACT

Circuits and methods for protecting polarity-sensitive components, such as light emitting diodes, electrolytic capacitors or integrated circuits, operating from a DC current source including a DC motor, an inductor or relay having a positive terminal and a negative terminal for receiving current from the current source, a protection diode connected parallel with the positive and negative terminals of the motor in a reverse bias configuration, at least one polarity-sensitive component connected in parallel with the protection diode and the DC motor, and a polarity protection transistor connected either between the nominally positive current source terminal and the positive motor terminal, or between the nominally negative current source terminal and the negative motor terminal.

27 Claims, 5 Drawing Sheets

PROTECTION OF POLARITY-SENSITIVE COMPONENTS CONNECTED IN PARALLEL WITH A DIRECT CURRENT MOTOR OR INDUCTOR

FIELD OF THE INVENTION

The present invention relates generally to methods and apparatus for improved reverse polarity protection of electronic circuitry associated with a direct current (DC) electric motor, such as light emitting diodes (LEDs), integrated circuits, electrolytic capacitors, and the like.

BACKGROUND OF THE INVENTION

Power circuitry for driving DC (direct current) electric motors is also typically connected to other electronic circuitry including polarity sensitive devices, such as light emitting diodes (LEDs), integrated circuits, electrolytic capacitors and the like.

In simple motorized devices, such as electric fans and shavers, the motor is driven from a source of electrical power. The type of electrical power source selected depends upon the type of motor. The type of motor of concern herein is a DC motor. Such motors typically have a permanent magnet in the stator and brushes to transfer current to the winding on the rotor. A typical power source for such motors may be one or more DC batteries or an alternating current (AC) adapter which converts higher AC voltage to a lower DC voltage utilized by the DC motor.

For economy reasons, ancillary electrical or electronic circuits may also receive electrical power from the same voltage supply as the motor. Such ancillary circuits may include a lamp (incandescent or, more typically, LEDs), a radio, a clock, other motors, a negative ion generator, or the like. Many of these ancillary circuits are polarity sensitive, that is, the positive terminal must be at a higher voltage than the negative terminal to prevent potentially catastrophic damage. For example, LEDs and electrolytic capacitors are two common polarity-sensitive components. Such components tolerate very little reverse polarization without incurring permanent damage.

Problems may occur when these polarity-sensitive components (PSCs) are connected in parallel with the terminals of the DC motor, such as when the current supply is removed from the motor by a mechanical switch or other means of disconnection. The motor windings are inductors and energy is stored in the windings in the form of the associated magnetic fields. Further, the rotor and any flywheel attached to the motor shaft have kinetic energy related to the angular momentum of the rotor and flywheel. When the external power supply is removed from the motor, the motor briefly acts as a generator, which creates a reverse voltage across its electric terminals. Thus, this reverse polarity voltage is then applied to any circuitry, including polarity-sensitive components, connected across the motor terminals.

There are two typical ways to provide reverse-polarity protection in circuits which combine electric motors with ancillary electrical components. The first way is to provide a diode which is ordinarily reverse biased across the motor terminals. This is shown in FIG. 1A. When the power supply is removed, as shown in FIG. 1B, the current flows from the negative motor terminal through the (now forward biased) protection diode back into the motor. Resistance in the motor windings eventually dissipates the energy stored in the magnetic field of the windings and the kinetic energy of the motor rotor along with fan blades, other mechanical loads or a flywheel. A flywheel is a device which may be used for storing energy in the form of angular momentum.

The second method to provide reverse-polarity protection in circuits is to place a non-electrolytic capacitor across the motor terminals, as shown in FIG. 2A. When the external power supply is removed, as shown in FIG. 2B, the current produced by the motor (now acting as a generator with a flywheel) serves to reverse charge the capacitor. The capacitor will, then, discharge through the motor and dissipate energy in the windings of the armature. Of course, the capacitance value must be sufficiently high to absorb the stored energy in the motor, and the kinetic energy of the rotor and flywheel, without raising the voltage across the capacitor and motor to levels which would result in damage to any polarity-sensitive components.

It should be clear then that a reverse polarity condition is always created when the motor current is removed or otherwise interrupted. However, in the case of the protection diode, the voltage may be much lower; such as limited to the forward bias voltage drop of the diode, which is typically 0.7 Volts in the case of a silicon diode. The capacitor could create much higher voltages, especially if its capacitance is low relative to the amount of energy stored in the motor and flywheel. Thus, protection diodes are commonly used to protect ancillary circuitry (or power supply or power control circuitry) from damage from the voltage reversing effects of motors and relays.

This arrangement works well as long as the polarity of the power supply is fixed. However, if the polarity of the power supply is reversed, then all the circuits in FIGS. 1A and 1B will encounter a reverse polarity. In addition to the motor and the polarity-sensitive components, the protection diode may also encounter high reverse voltages. Without any resistance in series with the protection diode, it, too, may fail because of excessive forward current.

One method of protecting the protection diode from excessively high current levels is to ensure that only a proper polarity supply voltage is presented to the motor terminals. This can be achieved by using a full-wave bridge rectifier. Then, irrespective of the polarity of the applied input voltage, the output always has the correct polarization. However, such devices are relatively expensive and increase the amount of energy dissipated even when correct polarity voltage is applied. This is because two diodes in the bridge are always in conduction, thereby causing two voltage drops across the conducting diodes instead of one, as compared to using a single reverse polarity diode.

A general object of the present invention is therefore to provide improved protection for polarity-sensitive components which are connected in parallel with motors or other inductive components.

Another object of the present invention is to provide reverse polarity protection for light emitting diodes, electrolytic capacitors or integrated circuits.

A further object of the present invention is to provide a protection transistor in series with a motor to protect polarity-sensitive components.

Yet another object of the present invention is to provide reverse polarity protection in circuits which include inductors, relays, or the like.

A still further object of the present invention is to provide methods for protecting polarity-sensitive components which are connected in parallel with motors or other inductive components.

SUMMARY OF THE INVENTION

The present invention is directed to a circuit for protecting polarity-sensitive components operating from a current source of direct current, with the current source having a nominally positive terminal and a nominally negative terminal. The circuit may include a direct current motor or an inductor, relay or the like, having a positive terminal and a negative terminal for receiving direct current from the current source, a protection diode connected parallel with the positive and negative terminals of the motor in a reverse bias configuration, at least one polarity-sensitive component connected in parallel with the protection diode and the direct current motor, and a polarity protection transistor connected either between the nominally positive current source terminal and the positive motor terminal, or between the nominally negative current source terminal and the negative motor terminal.

The circuit may further include a polarity protection transistor of the NPN type connected between the nominally negative current source terminal and the negative motor terminal, with a collector terminal of the NPN transistor connected to the negative terminal of the motor and an emitter terminal of the NPN transistor connected to the nominally negative terminal of the current source. The transistor of the NPN type may have its base terminal coupled through a resistor to the nominally positive terminal of the current source to bias the NPN transistor to conduct current through the motor.

The circuit may further include a polarity protection transistor of the PNP type connected between the nominally positive current source terminal and the positive motor terminal, with a collector terminal of the PNP transistor connected to the positive terminal of the motor and an emitter terminal of the PNP transistor connected to the nominally positive terminal of the current source. The transistor of the PNP type may have its base terminal coupled through a resistor to the nominally negative terminal of the current source to bias the PNP transistor to conduct current through the motor.

The polarity-sensitive component may be a light emitting diode, such as of the white light type, an electrolytic capacitor or an integrated circuit. A flywheel may be connected to the motor, with the flywheel having kinetic energy in the form of angular momentum. The flywheel may be a fan blade, a pump mechanism or be further comprised of a clutch which permits the flywheel to spin ahead of the motor to prevent transfer of kinetic energy to the motor.

The present invention is also concerned with methods for protecting polarity-sensitive components operating from a current source of direct current, the current source having a nominally positive terminal and a nominally negative terminal. The methods may include the steps of providing a direct current motor, inductor, relay or the like, having a positive terminal and a negative terminal for receiving direct current from the current source, connecting a protection diode in parallel with the positive and negative terminals of the motor in a reverse bias configuration, connecting at least one polarity-sensitive component in parallel with the protection diode and the direct current motor, and connecting a polarity protection transistor either between the nominally positive current source terminal and the positive motor terminal, or between the nominally negative current source terminal and the negative motor terminal.

Further steps of the methods may include providing an NPN polarity protection transistor connected between the nominally negative current source terminal and the negative motor terminal, connecting a collector terminal of the NPN transistor to the negative terminal of the motor, connecting an emitter terminal of the NPN transistor is to the nominally negative terminal of the current source, coupling a base terminal of the transistor of the NPN type through a resistor to the nominally positive terminal of the current source to bias the NPN transistor to conduct current through the motor.

Still further steps of the methods may include the steps of providing a PNP polarity protection transistor connected between the nominally positive current source terminal and the positive motor terminal of the PNP type, connecting a collector terminal of the PNP transistor to the positive terminal of the motor, connecting an emitter terminal of the PNP transistor is to the nominally positive terminal of the current source, and coupling a base terminal of the transistor of the PNP type through a resistor to the nominally negative terminal of the current source to bias the PNP transistor to conduct current through the motor.

The methods also include the steps of selecting the polarity-sensitive component to be a light emitting diode, an electrolytic capacitor, or an integrated circuit.

BRIEF DESCRIPTION OF THE DRAWINGS

The invention, together with its objects and the advantages thereof, may best be understood by reference to the following description taken in conjunction with the accompanying drawings, in which like reference numerals identify like elements in the figures, and in which.

DESCRIPTION OF THE PREFERRED EMBODIMENTS

It will be understood that the present invention may be embodied in other specific forms without departing from the spirit thereof. The present examples and embodiments, therefore, are to be considered in all respects as illustrative and not restrictive, and the invention is not to be limited to the details presented herein.

Figure 1A:
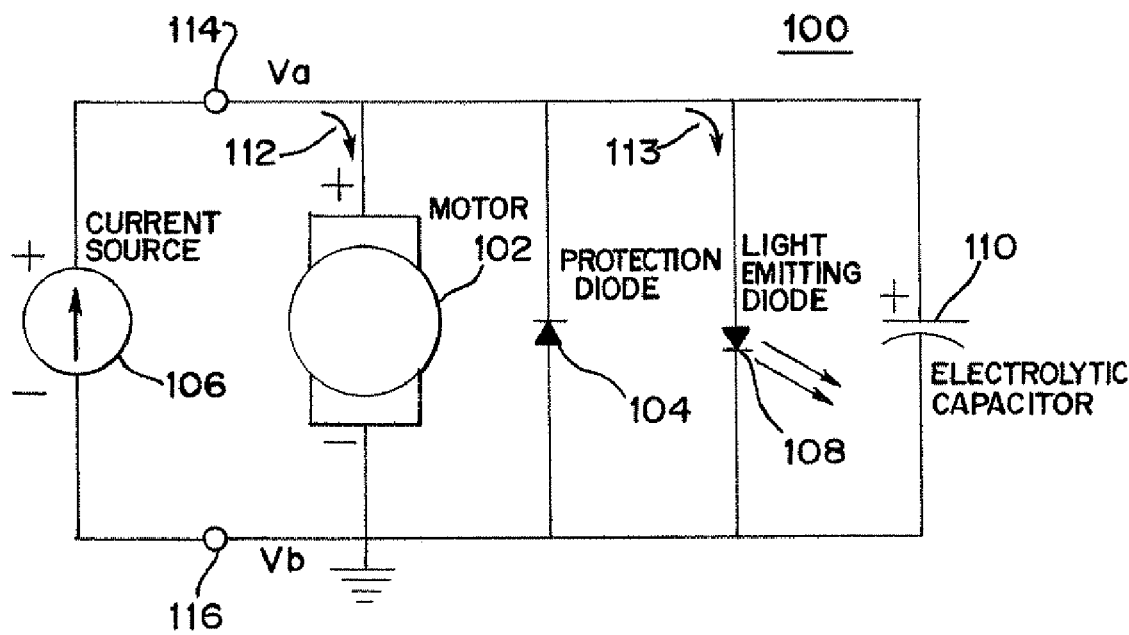
FIGS. 1A and 1B are circuit diagrams illustrating protection for polarity-sensitive components in accordance with prior art techniques.

FIG. 1A is an electrical schematic for a motorized device 100, including a motor 102. Device 100 includes polarity-sensitive components (PSCs) whose ancillary circuits are protected by a diode 104. As can be seen in this figure, a current source 106, which has a nominal positive terminal and nominal negative terminal, is attached in parallel to the DC motor 102. The current source 106 could be a battery, a photovoltaic cell, an AC-DC wall mount adapter, or the like. Also attached are ancillary components, which are represented in FIG. 1A by a light emitting diode (LED) 108 and an electrolytic capacitor 110.

The current direction arrows 112 and 113 show the normal flow of DC current while operating in steady state. When voltage Va at terminal 114 is greater than voltage Vb at terminal 116, the motor 112 can operate in a forward direction and the light emitting diode 108 is forward biased, allowing it to emit light. In an actual circuit, there would likely be a current limiting resistor wired in series with the LED 108 to keep currents under the maximum allowed for normal operation. Such a current limiting resistor is not illustrated but should be assumed to be present in all schematics shown in FIG. 1A through FIG. 6.

With voltage Va greater than voltage Vb, it will be noted that the protection diode 104 is in reverse bias, so no current flows through it. Also note that the electrolytic capacitor 110 sees a higher voltage at its anode than its cathode, which is the correct polarization. However if voltage Vb was greater than voltage Va, then electrolytic capacitor 110 would be reverse polarized, which would start a chemical reduction reaction inside the capacitor that would damage it.

Figure 1B:
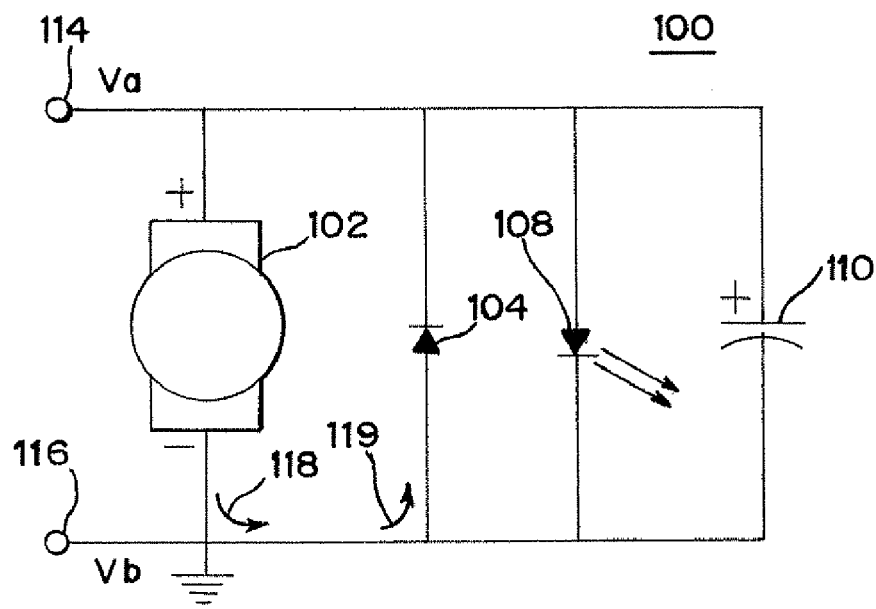

FIG. 1B illustrates what happens when the current source 106 is suddenly removed from the circuit. The motor 102 continues to spin because of the angular momentum of the flywheel attached to the motor (not shown). The motor 102 presents a positive voltage at its negative terminal and the protection diode 104 is now forward biased since voltage Vb is greater than voltage Va. The protection diode 104 now provides a return path for the current created by the motor 102, as shown by the current direction arrows 118 and 119. The energy in the motor 102 is eventually dissipated through resistance in the motor windings and through the interconnecting wiring.

However, when voltage Vb is greater than voltage Va as in FIG. 1B, the LED 108 is in reverse bias. The excessive reverse bias potential would destroy the LED 108 if it were not for the protection diode 104 which limits the difference between voltage Vb and voltage Va to the band gap voltage of the protection diode, which is about 0.7 volts for a silicon diode. The electrolytic capacitor 110 is similarly protected from extreme reverse polarization by protection diode 104.

The protection of the ancillary components in the circuit relies not only on the protection diode 104, but also on a constancy of the polarization of the current supply. It can be seen from FIGS. 1A and 1B that if the polarization of current source 106 is reversed, i.e. voltage Vb is greater than voltage Va, then both the electrolytic capacitor 110 and the LED 108 will see reverse polarization at the full supply voltage. The protection diode 104 will then also be forward biased and would be subjected to the full supply current. All three devices would quickly fail. This is not an abstract concern because many DC appliances are powered from wall mount AC to DC adapters. Many of these adapters are sold with switches or attachments that allow the polarity of the output to be reversed by the end user. Thus, an error by the end user can result in a sudden deterioration or destruction of the appliance.

Figure 2A:
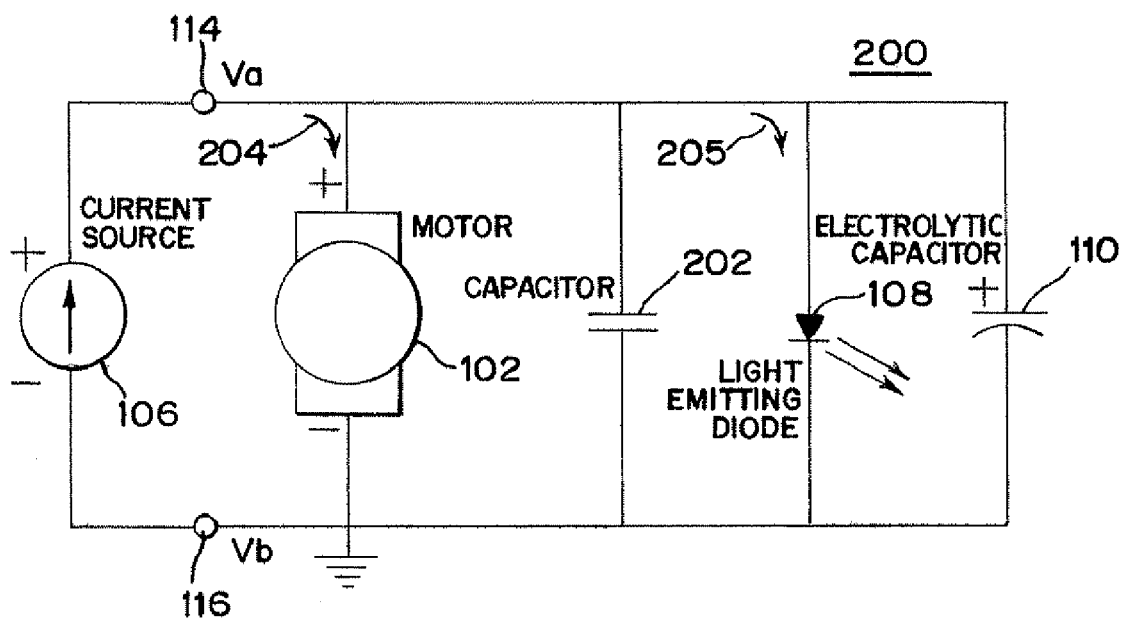
FIGS. 2A and 2B are circuit diagrams illustrating alternate means of protection for polarity-sensitive components in accordance with prior art techniques.
Figure 2B:
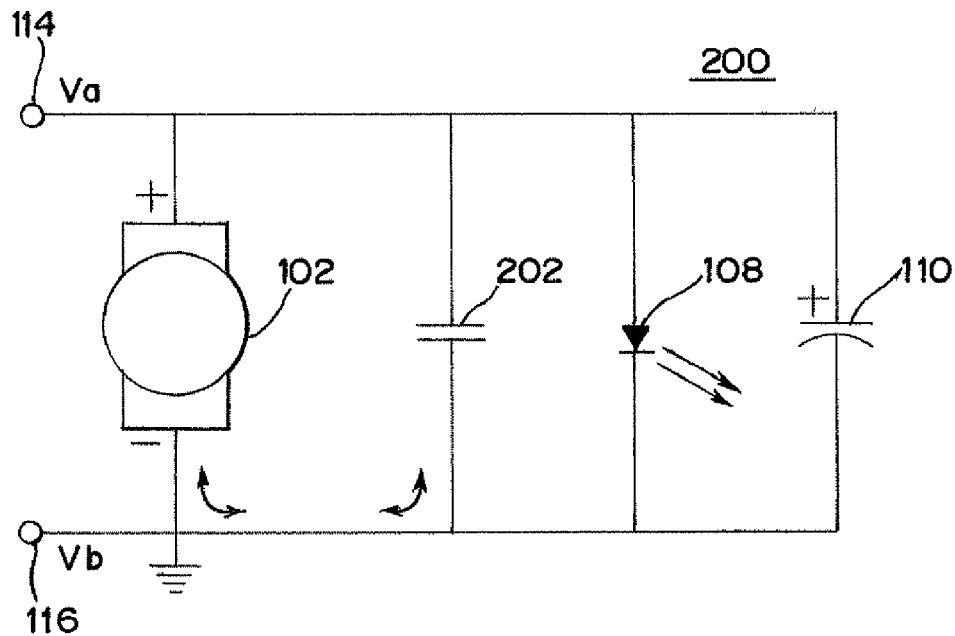

FIG. 2A illustrates an alternate prior art means of providing protection for the ancillary circuits of a device 200, which includes a DC current driven motor 102. In FIGS. 2A and 2B, a capacitor 202 replaces the protection diode 104 shown in FIGS. 1A and 1B. Under normal conditions, current flows through both the motor 102 and the LED 108, as indicated by the current direction arrows 204 and 205. The capacitor 202 blocks DC current. The circuit also has an electrolytic capacitor 110 which represents a second polarization sensitive device in addition to LED 108. The electrolytic capacitor 110 may be part of another circuit, such as a power supply which is not shown in FIG. 2A or 2B.

In the event that the current supply is suddenly removed as shown in FIG. 2B, the polarity of voltage Va versus voltage Vb is reversed and both the LED 108 and electrolytic capacitor 110 are subjected to reverse polarization. The amount of reverse polarization increases as the capacitor 202 charges with the current produced by the motor 102 as it winds down. If there is only a small amount of resistance in the circuit, the capacitor 202 may start to discharge back through the motor 102, even reversing the polarity once again as the inductive motor windings starts to charge up again. If the capacitor 202 is selected for larger capacitance, the amount of reverse polarization will be smaller. However, very large capacitors 202 are expensive and bulky, which may make the device 200 prohibitively expensive or unappealing in size. Such a non-polarity sensitive capacitor 202 might be an acceptable means of handling the rapid removal of power in those situations where there are no ancillary circuits that are polarity sensitive and where high reverse voltages can be tolerated.

Figure 3A:
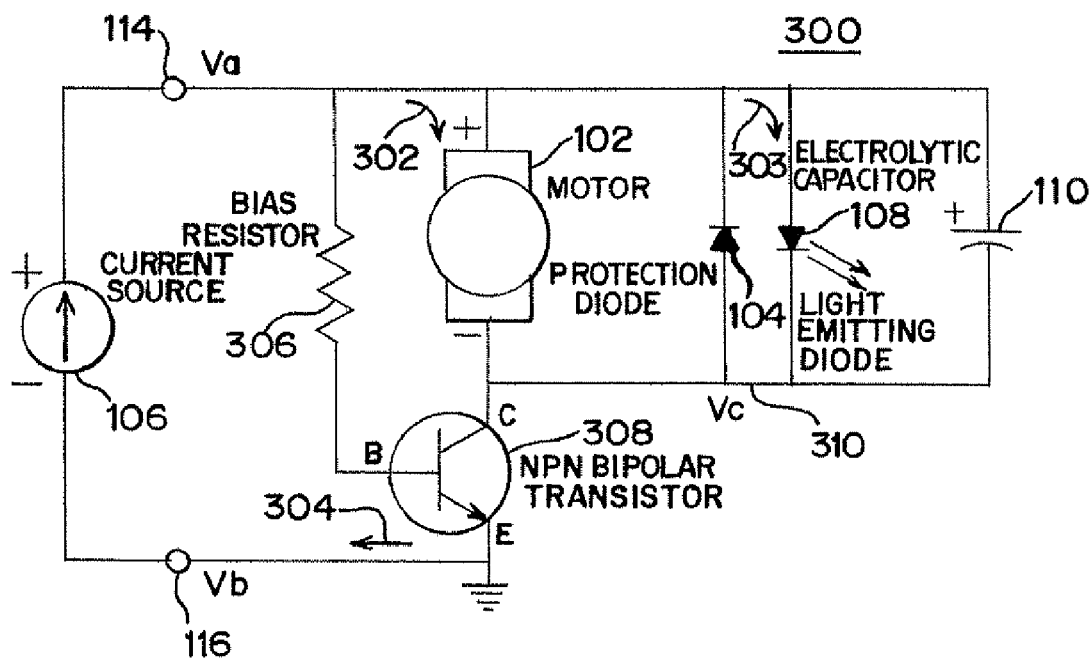
FIGS. 3A and 3B are circuit diagrams illustrating protection for polarity-sensitive components in accordance with the present invention.

In accordance with an embodiment of the present invention, FIG. 3A shows a device 300 which utilizes an NPN bipolar type of the transistor 308 to control the current supplied to the motor 102. The DC motor 102 may drive any number of devices or loads, such as fan blades, wheels, gear boxes, pumps, eccentric cams, or the like. These devices or loads will be collectively called "flywheels".

The negative terminal of the motor 102 and the ancillary components 108 and 110 and the anode terminal of diode 104 are attached via line 310 to the collector terminal C of the NPN transistor 308, instead of the negative terminal of the current supply 106, and the emitter terminal E of transistor 308 is then attached to the negative terminal of current supply 106. When the transistor 308 is forward biased, current will flow into the collector terminal C and out of the emitter terminal E, as indicated by current direction arrow 304. Current then flows through the motor 102 and through the ancillary components, such as LED 108, wired in parallel with the motor 102 as shown by current direction arrows 302 and 303.

The forward biasing the NPN transistor 308 can be achieved by connecting the base terminal B of the transistor 308 via a bias resistor 306 to the nominal positive terminal 114 of the current supply 106. As long as the voltage difference Va−Vb across terminals 114 and 116 is greater than the base to emitter junction voltage of the transistor 308, the transistor will be forward biased and current will flow from collector to the emitter terminals.

Figure 3B:
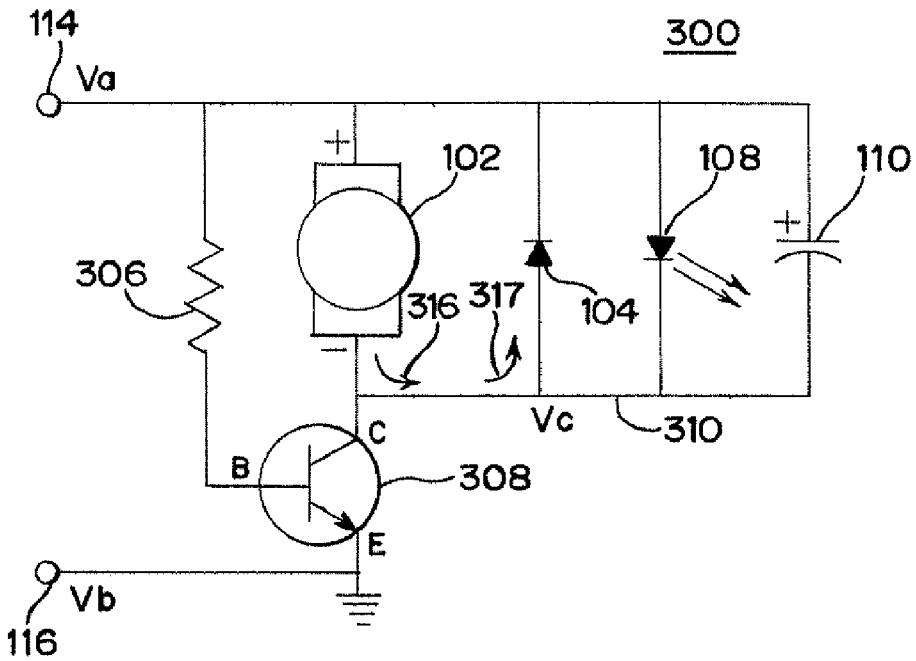

In the case of a sudden removal of the current supply 106 in FIG. 3B, the base to emitter junction of transistor 308 is no longer forward biased. Thus, transistor 308 becomes nonconductive. The emitter terminal E then no longer conducts any current and the base current is also zero. The collector terminal E of transistor 308 then looks like an open circuit. Any reverse current generated by motor 102 is then shunted by protection diode 104, as indicated by current direction arrows 316 and 317. Thus, the circuit in FIG. 3B behaves the similarly to the one in FIG. 1B, except that the circuit in FIG. 3B provides a higher level of reverse polarization protection.

Figure 4:
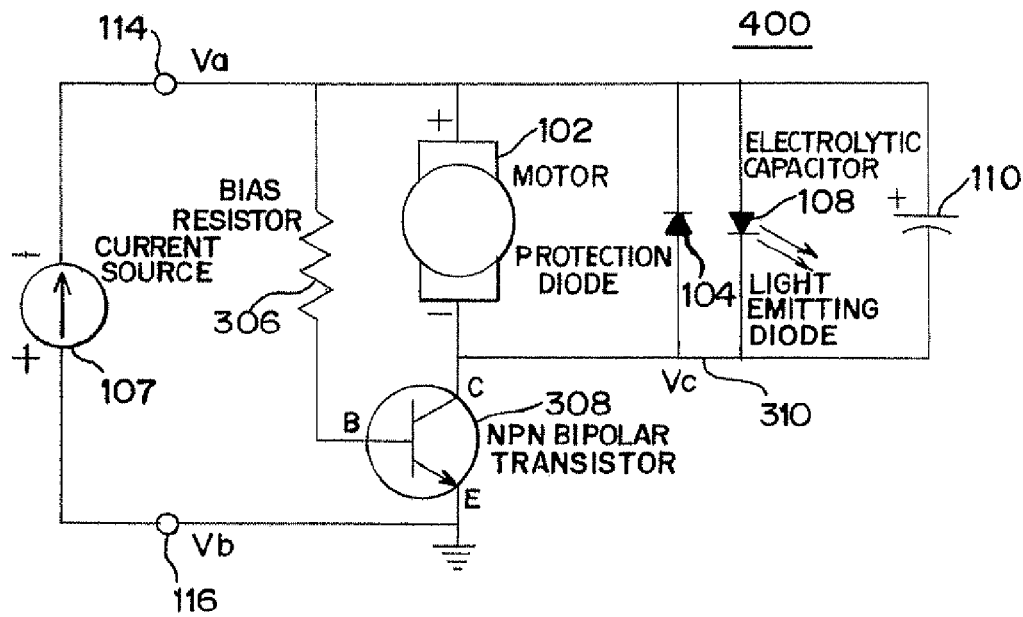
FIG. 4 is a circuit diagram illustrating protection for polarity-sensitive components when the circuit shown in FIGS. 3A and 3B is subjected to a reverse polarity current source in accordance with the present invention.

FIG. 4 shows what happens when the polarity of the current source 107 is accidentally reversed. The NPN transistor 308 is then in reverse bias at the base to emitter junction since the voltage Vb is greater than voltage Va between terminals 114 and 116. Thus, transistor 308 is nonconductive and no current is supplied from the collector terminal C. The collector terminal C looks like an open circuit. The voltage Vc on line 310 then floats to the same voltage as voltage Va at terminal 114 and none of the polarity sensitive components, such as LED 108 and electrolytic capacitor 110, are in reverse polarization.

Figure 5A:
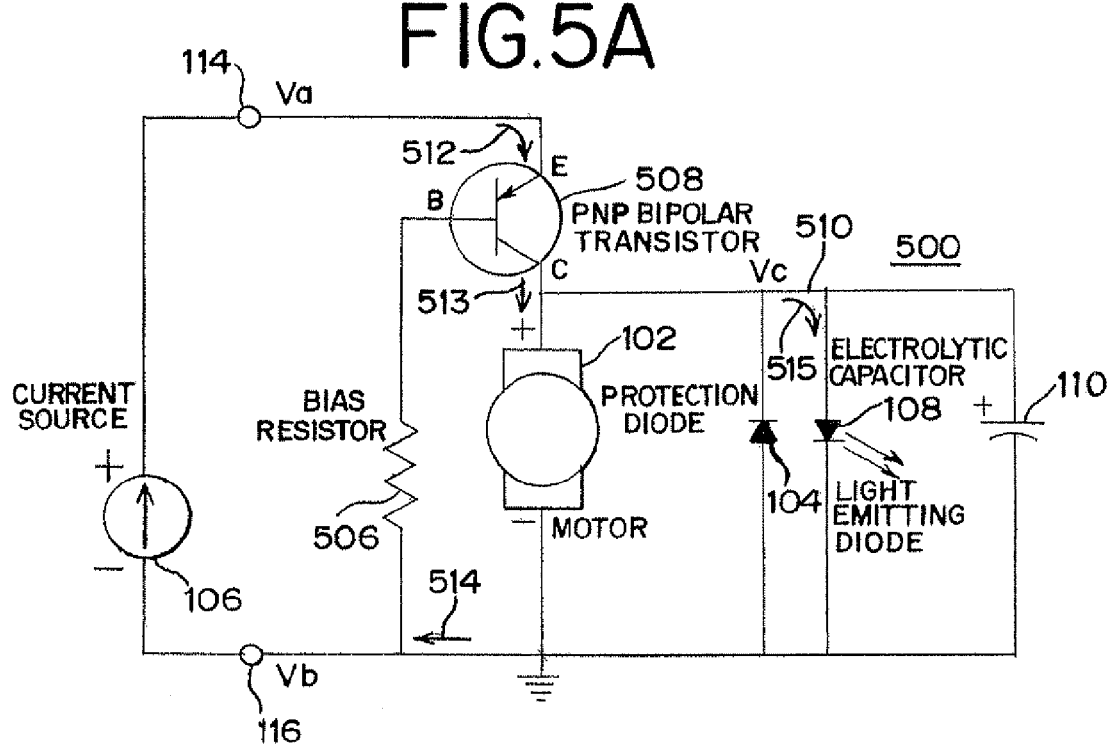
FIGS. 5A and 5B are circuit diagrams illustrating protection for polarity-sensitive components in accordance with the present invention.

The same method of circuit protection can be achieved by using a PNP bipolar transistor 508, but the circuit is configured differently. Referring to FIG. 5A, the positive terminal of the motor 102 and the positive terminals of the ancillary components, such as LED 108 and electrolytic capacitor 110, are now connected to line 510, which also connects to the collector terminal C of the PNP transistor 508. The emitter terminal E of transistor 508 is attached to the nominally positive terminal 114 of the current supply 107. As long as the voltage Va at the emitter terminal E is greater than the voltage at the base terminal B by more than the junction voltage of the transistor, current will flow from the emitter terminal E to the collector terminal C, as shown by current direction arrows 512 and 513. The transistor 508 can be forward biased by connecting the base terminal B to voltage Vb at terminal 116 via a bias resistor 506. The current flowing from the collector terminal C supplies the motor 102 and ancillary components 108 and 110 as shown by current direction arrow 515 for the LED 108.

Figure 5B:
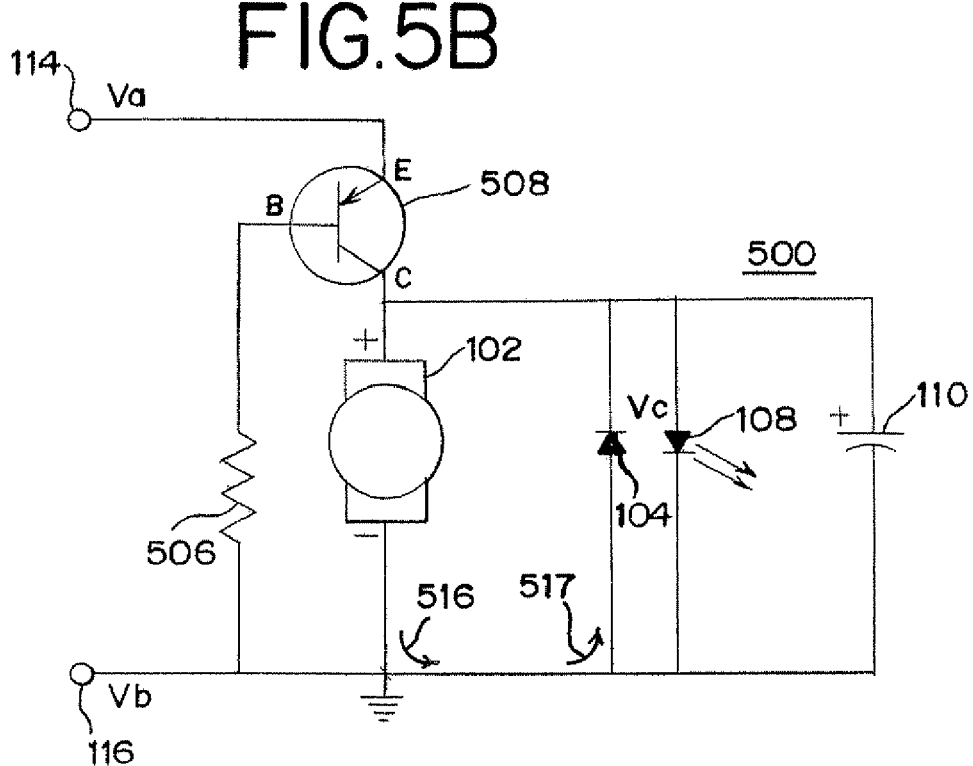

FIG. 5B shows the case when the current supply 107 is removed. Then, the base to emitter junction of transistor 508 is no longer forward biased. Transistor 508 is nonconductive and current ceases to flow through the transistor. Its collector terminal C looks like an open circuit. Any reverse current generated by motor 102 is then shunted by protection diode 104, as indicated by current direction arrows 516 and 517. In this case, the circuit behaves similarly to FIG. 1B, which was shown to provide reverse polarization protection, except that the circuit in FIG. 5B provides a higher level of reverse polarization protection.

Figure 6:
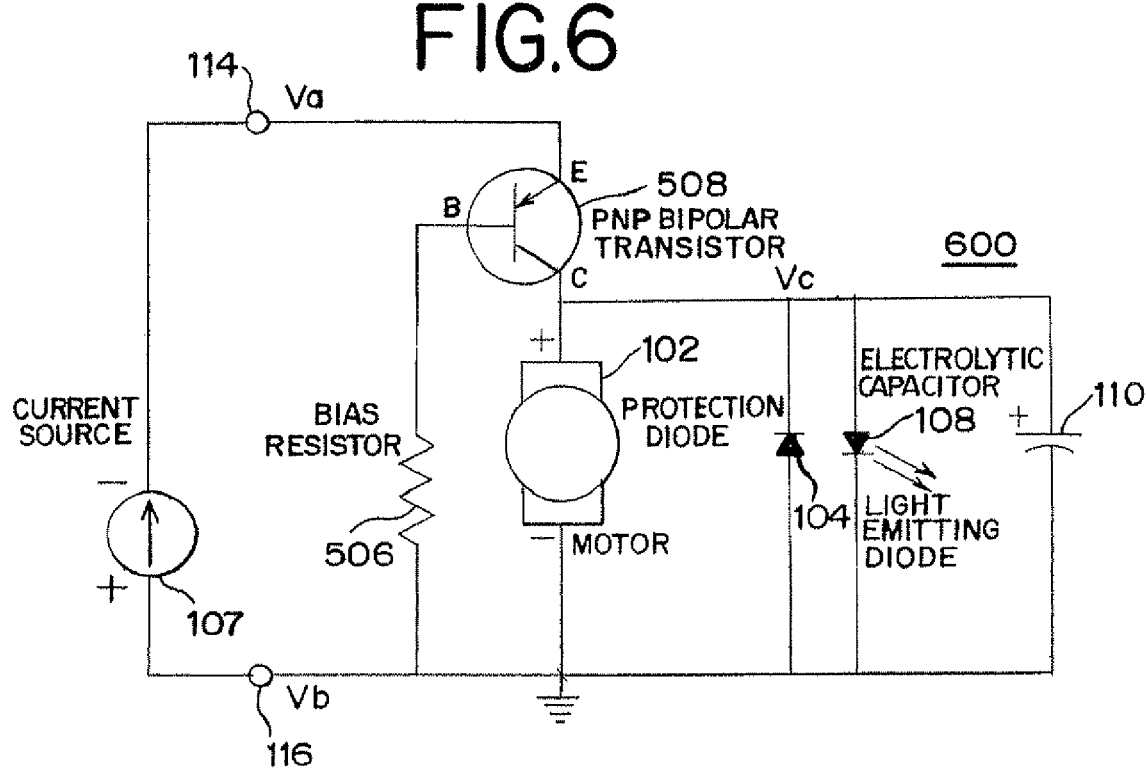
FIG. 6 is a circuit diagram illustrating protection for polarity-sensitive components when the circuit shown in FIGS. 5A and 5B is subjected to a reverse polarity current source in accordance with the present invention.

FIG. 6 shows what happens when the polarity of the current source is reversed with PNP transistor circuit protection. As previously shown, any reverse polarity of the current source 107 would ordinarily supply a reverse polarization at the full supply voltage to the polarity sensitive components leading to their rapid failure. However, with the PNP transistor 508 in place, reversing the polarity of the current supply 107 also reverses the bias applied to the PNP transistor 508. The base terminal B then sees a higher voltage than the emitter terminal E, so transistor 508 is nonconductive and no current is supplied from the collector terminal C. Therefore, the collector terminal C looks like an open circuit. The circuit behaves the similarly to that shown in the FIG. 1B, except that the circuit in FIG. 6 provides a higher level of reverse polarization protection.

As will be appreciated from the above disclosure, with the protection transistors 308 or 508 in place, a reverse connection of the current supply 107 results in non-operation of the motor 102 since the transistor 308 or 508 blocks current to the motor and to the polarity sensitive components. Thus, the circuit only needs to provide safe dissipation of energy stored in the motor and flywheel, if any.

It will also be appreciated that an alternate means to protect the circuit from reverse connection of the current supply 107 could include a full wave rectifier (diode) bridge between the current supply 107 and the motor terminals. However, such full wave rectifier bridges are relatively expensive compared to the bipolar transistors 308 and 508. Furthermore, such full wave rectifier bridges result in a voltage drop across two semiconductor junctions, rather than one as in FIGS. 3A through 6. This reduces efficiency.

The circuits shown in FIGS. 3A through 6 similarly provide protection where the motor 102 is replaced by a solenoid. The solenoid also is an inductor, but the amount of energy stored in the magnetic field may be much greater than the kinetic energy from the linear movement of the slug or iron core in the solenoid.

Another embodiment of the present invention is directed to a device using an inductor and which includes protection for polarity sensitive components. The inductive component or solenoid has positive and negative terminals. A source of direct current has nominally positive and nominally negative terminals that have the possibility of deliberate or accidental reversal. A protection diode is connected in parallel with the terminals of the inductive component or solenoid in a normally reverse bias configuration. A polarity-protection transistor inserted either a) between the nominally positive current source terminal and the positive inductor terminal or b) between the nominally negative current source terminal and the negative inductor terminal.

The preceding disclosure provides a detailed description and background information on a new way of protecting ancillary polarity-sensitive components used with DC motors and solenoid devices when they receive power from a common current supply.

While particular embodiments of the invention have been shown and described, it will be obvious to those skilled in the art that changes and modifications may be made therein without departing from the invention in its broader aspects.

The invention claimed is:

1. A circuit for protecting polarity-sensitive components operating from a current source of direct current, said current source having a nominally positive terminal and a nominally negative terminal, said circuit comprising:
 a direct current motor having a positive terminal and a negative terminal for receiving direct current from the current source,
 a protection diode coupled parallel with the positive and negative terminals of the motor in a reverse bias configuration,
 at least one polarity-sensitive component coupled in parallel with the protection diode and the direct current motor, and
 a polarity protection transistor coupled in series with the direct current motor between the nominally positive terminal and the nominally negative terminal of the current source.

2. The circuit for protecting polarity-sensitive components in accordance with claim 1, said polarity protection transistor coupled either between the nominally positive current source terminal and the positive motor terminal, or between the nominally negative current source terminal and the negative motor terminal.

3. The circuit for protecting polarity-sensitive components in accordance with claim 1, wherein said polarity protection transistor which is coupled between the nominally negative current source terminal and the negative motor terminal is of the NPN type, with a collector terminal of the NPN transistor coupled to the negative terminal of the motor, with an emitter terminal of the NPN transistor is coupled to the nominally negative terminal of the current source, and with a base terminal coupled through a resistor to the nominally positive terminal of the current source to bias the NPN transistor to conduct current through the motor.

4. The circuit for protecting polarity-sensitive components in accordance with claim 1, wherein said polarity protection transistor which is coupled between the nominally negative current source terminal and the negative motor terminal is of the PNP type, with a collector terminal of the PNP transistor coupled to the positive terminal of the motor, with an emitter terminal of the PNP transistor coupled to the nominally positive terminal of the current source, and with a base terminal coupled through a resistor to the nominally negative terminal of the current source to bias the PNP transistor to conduct current through the motor.

5. The circuit for protecting polarity-sensitive components in accordance with claim 1, wherein said polarity-sensitive component comprises a light emitting diode.

6. The circuit for protecting polarity-sensitive components in accordance with claim 5, wherein said light emitting diode is of the white light type.

7. The circuit for protecting polarity-sensitive components in accordance with claim 1, wherein said polarity-sensitive component comprises an electrolytic capacitor.

8. The circuit for protecting polarity-sensitive components in accordance with claim 1, wherein said polarity-sensitive component comprises an integrated circuit.

9. The circuit for protecting polarity-sensitive components in accordance with claim 1, further comprising:
 a flywheel coupled to the motor, said flywheel having kinetic energy in the form of angular momentum.

10. The circuit for protecting polarity-sensitive components in accordance with claim 9, wherein said flywheel comprises a fan blade.

11. The circuit for protecting polarity-sensitive components in accordance with claim 9, wherein said flywheel comprises a pump mechanism.

12. The circuit for protecting polarity-sensitive components in accordance with claim 9, wherein said flywheel is further comprised of a clutch which permits the flywheel to spin ahead of the motor to prevent transfer of kinetic energy to the motor.

13. A circuit for protecting polarity-sensitive components operating from a current source of direct current, said current source having a nominally positive terminal and a nominally negative terminal, said circuit comprising:
 an inductor having a positive terminal and a negative terminal for receiving direct current from the current source,
 a protection diode coupled parallel with the positive and negative terminals of the inductor in a reverse bias configuration,
 at least one polarity-sensitive component coupled in parallel with the protection diode and the inductor, and
 a polarity protection transistor coupled in series with the inductor between the nominally negative current source terminal and the negative inductor terminal of the current source.

14. The circuit for protecting polarity-sensitive components in accordance with claim 13, said polarity protection transistor coupled either between the nominally positive current source terminal and the positive inductor terminal, or between the nominally negative current source terminal and the negative inductor terminal.

15. The circuit for protecting polarity-sensitive components in accordance with claim 13, wherein said polarity protection transistor which is coupled between the nominally negative current source terminal and the negative inductor terminal is of the NPN type, with a collector terminal of the NPN transistor coupled to the negative terminal of the inductor, with an emitter terminal of the NPN transistor is coupled to the nominally negative terminal of the current source, and with a base terminal coupled through a resistor to the nominally positive terminal of the current source to bias the NPN transistor to conduct current through the inductor.

16. The circuit for protecting polarity-sensitive components in accordance with claim 13, wherein said polarity protection transistor which is coupled between the nominally negative current source terminal and the negative inductor terminal is of the PNP type, with a collector terminal of the PNP transistor coupled to the positive terminal of the inductor, with an emitter terminal of the PNP transistor coupled to the nominally positive terminal of the current source, and with a base terminal coupled through a resistor to the nominally negative terminal of the current source to bias the PNP transistor to conduct current through the inductor.

17. The circuit for protecting polarity-sensitive components in accordance with claim 13, wherein said polarity-sensitive component comprises a light emitting diode.

18. The circuit for protecting polarity-sensitive components in accordance with claim 17, wherein said light emitting diode is of the white light type.

19. The circuit for protecting polarity-sensitive components in accordance with claim 13, wherein said polarity-sensitive component comprises an electrolytic capacitor.

20. The circuit for protecting polarity-sensitive components in accordance with claim 13, wherein said polarity-sensitive component comprises an integrated circuit.

21. A method for protecting polarity-sensitive components operating from a current source of direct current, said current source having a nominally positive terminal and a nominally negative terminal, said method comprising the steps of:
 providing a direct current motor having a positive terminal and a negative terminal for receiving direct current from the current source,
 coupling a protection diode in parallel with the positive and negative terminals of the motor in a reverse bias configuration,
 coupling at least one polarity-sensitive component in parallel with the protection diode and the direct current motor, and
 coupling a polarity protection transistor in series with the direct current motor between the nominally positive terminal and the nominally negative terminal of the current source.

22. The method for protecting polarity-sensitive components in accordance with claim 21, said method comprising the further steps of:
 coupling the polarity protection transistor between the nominally positive current source terminal and the positive motor terminal, or
 coupling the polarity protection transistor between the nominally negative current source terminal and the negative motor terminal.

23. The method for protecting polarity-sensitive components in accordance with claim 21, said method comprising the further steps of:
 providing said polarity protection transistor which is coupled between the nominally negative current source terminal and the negative motor terminal of the NPN type,
 coupling a collector terminal of the NPN transistor to the negative terminal of the motor,
 coupling an emitter terminal of the NPN transistor is to the nominally negative terminal of the current source, and
 coupling a base terminal of the transistor of the NPN type through a resistor to the nominally positive terminal of the current source to bias the NPN transistor to conduct current through the motor.

24. The method for protecting polarity-sensitive components in accordance with claim 21, said method comprising the further steps of:

providing said polarity protection transistor which is coupled between the nominally positive current source terminal and the positive motor terminal of the PNP type, coupling a collector terminal of the PNP transistor to the positive terminal of the motor, coupling an emitter terminal of the PNP transistor is to the nominally positive terminal of the current source, and coupling a base terminal of the transistor of the PNP type through a resistor to the nominally negative terminal of the current source to bias the PNP transistor to conduct current through the motor.

25. The method for protecting polarity-sensitive components in accordance with claim 21, said method comprising the further step of:

selecting the polarity-sensitive component to be a light emitting diode.

26. The method for protecting polarity-sensitive components in accordance with claim 21, said method comprising the further step of:

selecting the polarity-sensitive component to be an electrolytic capacitor.

27. The method for protecting polarity-sensitive components in accordance with claim 21, said method comprising the further step of:

selecting the polarity-sensitive component to be an integrated circuit.

* * * * *